(12) United States Patent
Carpenter (10) Patent No.: US 11,167,683 B2
(45) Date of Patent: Nov. 9, 2021

(54) STAKE POCKET CHAIN TIE-DOWN

(71) Applicant: Tyler Carpenter, Lincolnton, NC (US)

(72) Inventor: Tyler Carpenter, Lincolnton, NC (US)

( * ) Notice: Subject to any disclaimer, the term of this patent is extended or adjusted under 35 U.S.C. 154(b) by 88 days.

(21) Appl. No.: 16/671,261

(22) Filed: Nov. 1, 2019

(65) Prior Publication Data

US 2020/0139875 A1 May 7, 2020

Related U.S. Application Data

(60) Provisional application No. 62/754,123, filed on Nov. 1, 2018.

(51) Int. Cl.
*B60P 7/08* (2006.01)
*B62D 33/02* (2006.01)
*B60P 3/079* (2006.01)

(52) U.S. Cl.
CPC ............. *B60P 7/0807* (2013.01); *B60P 3/079* (2013.01); *B62D 33/0207* (2013.01)

(58) Field of Classification Search
CPC ......... B60P 7/0807; B60P 3/40; B60P 7/0815; B60P 3/002; B60P 3/122; B60P 7/10; B60P 7/13; B60P 1/26; B60P 1/43; B60P 1/435; B60P 3/04
USPC ...... 296/43, 36, 3, 186.5, 10, 100.18, 26.13, 296/37.6, 50, 62, 61; 410/110, 106, 101, 410/116, 32, 37, 36, 102, 42, 89, 96, 92
See application file for complete search history.

(56) References Cited

U.S. PATENT DOCUMENTS

| | | | | | |
|---|---|---|---|---|---|
| 3,331,334 | A | * | 7/1967 | Broling | B61D 45/001 410/102 |
| 3,779,174 | A | * | 12/1973 | Doyle | B60P 7/08 410/121 |
| 3,779,502 | A | * | 12/1973 | Marberg | B65D 19/44 410/116 |
| 4,427,230 | A | * | 1/1984 | Avny | B62D 33/0207 105/380 |
| 5,051,047 | A | * | 9/1991 | Loncaric | F16B 37/046 410/77 |
| 8,393,666 | B1 | * | 3/2013 | Rhoton | B60P 7/0807 296/43 |
| 10,202,080 | B1 | * | 2/2019 | Burleson | B60R 3/007 |
| 10,406,964 | B1 | * | 9/2019 | Thompson | B60P 3/40 |
| D873,180 | S | * | 1/2020 | McCuskey | D12/106 |

* cited by examiner

*Primary Examiner* — D Glenn Dayoan
*Assistant Examiner* — Sunsurraye Westbrook
(74) *Attorney, Agent, or Firm* — John D. Dellinger (57) ABSTRACT

A stake pocket chain tie-down for a trailer or truck bed which is insertable into a stake pocket through an uppermost opening of the stake pocket. The stake pocket tie-down provides for connection of a load restraining chain to the trailer or truck bed. The stake pocket tie-down comprises an insert that is made of metal and dimensioned to fit securely within the interior of the stake pocket, and the insert has four sides and is closed by an end plate on at least one end. The end plate has a hole therethrough for passage of a chain. The insert has a pin and a hook or tab structure therein for the attachment of the end of the chain.

5 Claims, 6 Drawing Sheets

STAKE POCKET CHAIN TIE-DOWN

CROSS-REFERENCE TO RELATED APPLICATIONS

The present application claims the benefit under 35 USC 119(e) to U.S. Provisional Application No. 62/754,123, filed Nov. 1, 2018.

BACKGROUND OF THE INVENTION

1. Field of the Invention

The present invention relates to the field of cargo logistics. More particularly, the present invention relates to methods and apparatus for securing cargo in a flatbed truck or trailer.

Trucks and trailers comprise a high percentage of utility vehicles for hauling loads. However, it is often necessary to secure the load in a flatbed truck or trailer, or in a truck or trailer with a lower profile than the load to be retained, such as a pickup truck having low sides panels. These flatbed trucks and trailers and low side wall pickup trucks usually comprise stake pocket holes located in the four corners of the bed or trailer, with stake pockets also situated at specified distances along the sides of the bed or trailer. The stake pockets can be used to insert vertical stakes which can attach structures such as higher walls (such as to render the bed or trailer capable of retaining a taller profile load, or capable of containing cargo such as livestock) or structure such as a trailer cap or camper that covers the bed or trailer. The stake pockets can also be used to secure a load on the flatbed or low side wall pickup or trailer, such as by use of chains or other devices.

Several types of truck cargo strap or chained securing methods are in use and known in the prior art. There is a need for such securing devices and methods that can be easily installed and removed from the vehicle or trailer, as it is common for the vehicles used to not be dedicated to the specific hauling. Many of the devices that are available are difficult to use, inefficient, or eventually cause damage to the stake pockets of a truck or trailer bed. These devices sometimes require the user to throw a hook from one side of the truck, over the cargo load before cinching, winding up, or otherwise securing whatever type of cargo retaining means is used on the other side of the truck. This invites damage to the load, the truck, or the securement device.

The disclosed inventive concept uses a heavy-duty stake pocket chain tie-down which protects the stake pockets, is easily installed and removed, and which provides a housing for a length of chain to establish a secure, safe anchoring point at a plurality of stake pocket locations on the truck or trailer bed. The stake pocket chain tie-down comprises a chain and insert that are provided and manufactured separately, resulting in ease of replacement in the event that a chain is damaged or needs to be replaced. Moreover, the present invention provides a secure attachment with increased strength that prevents above deck damage because of the security of the above the deck insertion of the pockets insert.

2. Background of the Invention

U.S. Pat. No. 1,507,229 to Bosley discloses a stake pocket for vehicles. The stake pocket has a U-shaped member and a backing plate, which are fastened together with overlapping portions through which are adapted to be passed bolts that secure the pocket to the vehicle body or platform.

U.S. Pat. No. 3,331,334 to Broling discloses a stake pocket chain anchor that is insertable in the stake pocket of a vehicle from the top and which anchors with the underside of the stake pocket with a releasable locking member.

U.S. Pat. No. 3,677,562 to Bronstein discloses a crossbeam that spans the load carrying area in a load carrying vehicle such as a pick-up truck, which is connected at each end thereof to a vertical stake mounted in a stake pocket which is normally part of the vehicle body. The load can be secured against the cross-beam with a load retainer, such as a chain and cinch mechanism, the ends of which are firmly attached to the stakes.

U.S. Pat. No. 3,764,177 to Woodward discloses an adapter for supporting the bottom portion of a stake or post of predetermined dimensions, the device being dimensionally adjustable to be securely retained in sockets of various dimensions.

U.S. Pat. No. 3,779,174 to Doyle discloses a bulkhead for use on vehicles having an open flat cargo carrying surface and stake pockets has a retaining panel attached to the bed of the vehicle with a rack carried by the panel and a comb structure which is secured in the stake pockets. The rack and comb are secured together with a plurality of longitudinally spaced pegs and holes which permit longitudinal positioning of the bulkhead against the cargo. A bracket having a slot of two different cross-sections is provided on the bulkhead to cooperate with a chain to secure the bulkhead to the vehicle against relative vertical movements.

U.S. Pat. No. 4,427,230 discloses a stake system for flatbed vehicles wherein a single size stake body can be utilized with a suitably configured adapter secured to the lower portion thereof. The adapters are each sized to fit a particular stake pocket and enable the use of the single size stake body in conjunction with differently sized pockets. The stake bodies include slots for receiving sidewall-defining panels and they also include internally positioned retainers to receive and position a fastener element to facilitate the attachment of the adapter to the stake body. Additionally, a removable corner adapter permits the use of the same stake body cross section at each corner of the vehicle bed to receive and retain sidewall-defining panels at right angles to each other.

U.S. Pat. No. 4,257,570 to Rasmussen discloses a tie down assembly for use in securing one object to another, such as a camper to a truck, the tie down assembly including a specially configured anchor member rigidly secured to a surface and having a head spaced from the surface by a diametrically reduced neck portion. A bracket member is provided with an interlock slot configurated to permit removable attachment of the bracket member to the anchor member only when the interlock slot in the bracket member is oriented in a predetermined complementary way with respect to the special configuration of the camper anchor. Once attached to the anchor member, the bracket member may be freely rotated with respect to the anchor member but can be removed only when properly aligned. The bracket member is provided with a coupling means to receive a camper tie down turnbuckle or the like and because the bracket is rotatable upon the anchor, the bracket will automatically assume direct alignment with the turnbuckle and cannot become inadvertently detached from the anchor member while the tensioning force is exerted through the coupling to the bracket.

U.S. Pat. No. 5,141,277 to Alexander discloses a stake pocket insert includes a stake receiver and a clamp element designed to engage the interior of a conventional vehicle cargo bed stake pocket. The stake receiver has a cover plate that can be used to anchor a bed liner. The clamp element includes a bracket that engages the interior of the stake pocket and a protruding bolt that can also provide a tie down anchor.

U.S. Pat. No. 6,015,250 to Walsh discloses an invention in which a platform trailer includes a load carrying main frame and an elongated loading deck supported by the main frame and defining a generally planar surface upon which cargo may be loaded. An elongated side rail is attached to at least one of the loading deck and the main frame so that the side rail is disposed along a longitudinal edge of the trailer. The side rail defines an upwardly opening channel extending along the longitudinal edge. The channel has a planar central portion substantially parallel to a plane defined by an upper horizontal surface of the loading deck and opposing side portions extending vertically upward from the central portion.

U.S. Pat. No. 6,626,621 B1 to Hugg discloses a generally Y-shaped winch assembly is described for use with a trailer or truck. The winch assembly includes a stem portion having a pair of horizontally spaced-apart plates extending upwardly from the upper end thereof. A strap receiver mechanism is rotatably mounted on the plates and is controlled by a conventional winch ratchet assembly.

U.S. Pat. No. 6,939,095 B1 to Hugg discloses a tie-down strap or chain anchor is described for use with a trailer or truck. The anchor includes a stem portion which is adapted to be secured to one side of the bed of the trailer or truck. A pair of spaced-apart plates are secured to the upper end of the stem portion and have a U-shaped receiver secured thereto and extending therebetween which includes an inclined portion and a generally U-shaped portion at the lower end thereof. The U-shaped portion has a slot or notch formed therein.

U.S. Pat. No. 6,945,589 to Quesenberry discloses a truck bed cap assembly having a rigid truck bed cap and a truck bed cap retention device having two generally vertical sections and a cross section connecting the vertical sections wherein the two generally vertical sections protrude through holes in the roof of the cap and are adapted to be attached to a truck to provide positive retention of the truck bed cap to the truck in at least one direction, and wherein the cross section alone or in combination with the vertical sections substantially spans the lateral direction of the cap.

U.S. Pat. No. 7,334,972 B2 to Cash teaches a retractable tie down for tying a work vehicle down to a cargo vehicle is disclosed, the lie down including a retractor assembly fixed to the outer surface of a work vehicle; a belt with one end connected to the retractor assembly; and a coupling connected to the other end of the belt, wherein the belt has a length sufficient to reach the cargo vehicle.

U.S. Pat. No. 7,044,700 B2 to Tessier presents a strapping system which includes a pair of rollers supported by a frame above the deck which extend in a longitudinal direction of the deck. Strapping is rolled onto the rollers. Anchors at the free ends of the strapping can be secured along opposing sides of the deck. A tightener in the form of a crank and ratchet mechanism is coupled to the rollers for tensioning the strapping spanning between the rollers and the free ends anchored to the sides of the deck. The load is retained beneath the strapping under tension. The tightener permits common tensioning of all strapping of each roller in a single, time saving operation to ensure loads readily secured before transport.

U.S. Pat. No. 7,431,548 B2 to Acton discloses a housing assembly for housing a restraint device is provided. The housing assembly may be recessed into a floor or a wall of a building or a vehicle. The restraint device may be a retractor. The separate mounting plate may be moveably mounted to the storage chamber. The restraint device may be mounted to the storage cover. The restraint device may be mounted to the mounting plate. The housing assembly may be mounted in a recess in a support structure such as a wall or a floor. The wall or floor may be a support structure of for example and without limitation a building, a vehicle, a trailer and the like.

U.S. Pat. No. 8,192,119 B1 to Small discloses a trailer cargo strap rolling device for Conestoga-style and flatbed trailers including a base that fits into a trailer stake pocket, an adjustable post member secured into a selected height with a lock pin, and a winder assembly operated either manually or with a wireless drill with two prongs around which a trailer strap can be wound.

U.S. Pat. No. 8,393,666 to Rhoton is directed to trailer or truck bed cargo retaining and pocket protector device for flatbed trailers, industrial trucks, and Conestoga-style trucks is disclosed. The device includes a heavy-duty steel channel orthogonally welded to a flat iron base plate, the finished unit dimensioned so as to fit within the interior of a trailer stake pocket. A length of ⅜ inch grade 70 steel transport chain is permanently attached to a retaining rod which is welded to the exterior of the base plate. In this manner, cargo loads may be more reliably, efficiently, and safely secured in place on the truck bed by means of connection of additional lengths of chain, strap, steel rope, etc., to opposite-sided stake pockets, wherein each such stake pocket contains a pocket protector device.

U.S. Pat. No. 10,023,247 to Diller discloses a stake pocket anchor that attaches an accessory to a vehicle stake pocket. The stake pocket anchor includes an anchor assembly hung from a tensioning member. The anchor assembly includes two channel members slidably attached to sandwich a center block, with an angled slide direction that enables sliding either upwardly and inwardly to a minimum anchor assembly width or downwardly and outwardly to a maximum anchor assembly width. During use, the anchor assembly gravitationally releases to its maximum anchor assembly width after being inserted through the stake pocket opening. The tensioning member is then used to vertically raise the anchor assembly within the stake pocket until a top of the anchor assembly contacts a bottom surface of the lip and thereafter allows further tightening of the anchor assembly against the bottom surface of the lip.

Despite the presence of these and other inventions that purport to be useful for securing a load in a flat or low-profile vehicle, there remains a need for an improved stake pocket chain tie-down that can be easily installed and removed from the vehicle or trailer, which is easy to use, efficient, and has lower risk of damaging the device, the vehicle, or the load. Accordingly, it is an object of the present invention to provide such an improved stake pocket chain tie-down. These and additional objects, advantages, features and benefits of the present invention will become apparent from the following specification.

SUMMARY OF THE INVENTION

The present invention is a stake pocket chain tie down. The device is used by inserting it into the stake pockets of flatbed trailers, industrial trucks, and other trucks that have stake pockets. The device is installed by inserting the insert portion of the device down through the stake pocket from the top of the stake pocket hole. In an embodiment, the device comprises an insert and a chain that are provided and manufactured separately. The insert can be manufactured of any metal or alloy known in the art that is suitable to one skilled in the art. In an embodiment, the insert comprises a bracket channel manufactured with a heavy-duty steel c-channel shape, and orthogonally welded to a flat metal plate at each end. In some embodiments, the flat metal plate may be only welded at the first end. The bracket channel comprises a back side and left and right lateral sides, and is dimensioned so as to fit within the interior of a stake pocket securely. The metal plates are at the first and, if present, second end of the bracket channel. The metal plates are essentially rectangular and flat. The first end metal plate at the first end of the bracket is oversized relative to the bracket channel and the stake pocket, with a lip extending well beyond the edges of the bracket channel and edges of the stake pocket hole entry. The first end metal plate comprises a chain hole therethrough at approximately the center of the plate, with said hole sufficient to pass a chain. The chain may be any chain or similar fastening device known to one skilled in the art. An example of a suitable chain is a length of 5/16 inch grade 70 steel transport chain. When not in use, the chain can be fed through the chain hole and stored in the bracket channel. The bracket channel insert comprises right and left retaining holes provided through the right and left lateral walls of the bracket channel insert, respectively. These retaining holes in each side allows a pin to be inserted into the channel and, in some embodiments, through the chain at the same time, thus anchoring the chain to the channel and indirectly to the trailer. For its installation, the bracket channel insert is inserted from the top of the stake pocket. The oversized first end metal plate welded to the first end of the bracket channel insert overlaps onto the surface of the bed or trailer adjacent the stake pocket hole to secure the first end of the bracket channel insert to the uppermost portion of the stake pocket. The first end metal plate has a chain hole through which the chain is inserted to gain access to the retaining pin. In this embodiment, the chain is attached to the pin that is inserted between the two retaining holes.

The present invention is used initially with the driver or cargo loader inserting a desired number of the inserts in the appropriate stake pockets. To accomplish this at each desired stake pocket location, the insert is placed into the stake pocket. A first end of a suitable length of chain is placed through the chain hole and the pin is placed through the one of the two retaining holes, through the first end of the chain, and then through the other of the two retaining holes, thereby attaching the chain to the pin. The portion of the chain that extends beyond the insert is used to secure the load, including by binding to a loaded object, or by extending the chain or other similar binding device to another stake pocket with another insert positioned therein, to which the opposite end of the chain or other binding device is secured by insertion through the chain hole and securement to the pin in the same manner.

REFERENCE NUMBERS IN THE DRAWINGS

1 Insert (or Bracket Channel)
2 Back of Insert
3 Front of Insert
4 Right Side of Insert
5 Left Side of Insert
6 First End Plate
7 Second End
8 Lip
9 Right Retaining Hole
10 Left Retaining Hole
11 Chain Securement Hook
12 Chain Hole
13 Chain Securement Tab
14 Pin

DETAILED DESCRIPTION OF THE PREFERRED EMBODIMENTS

Figure 1:
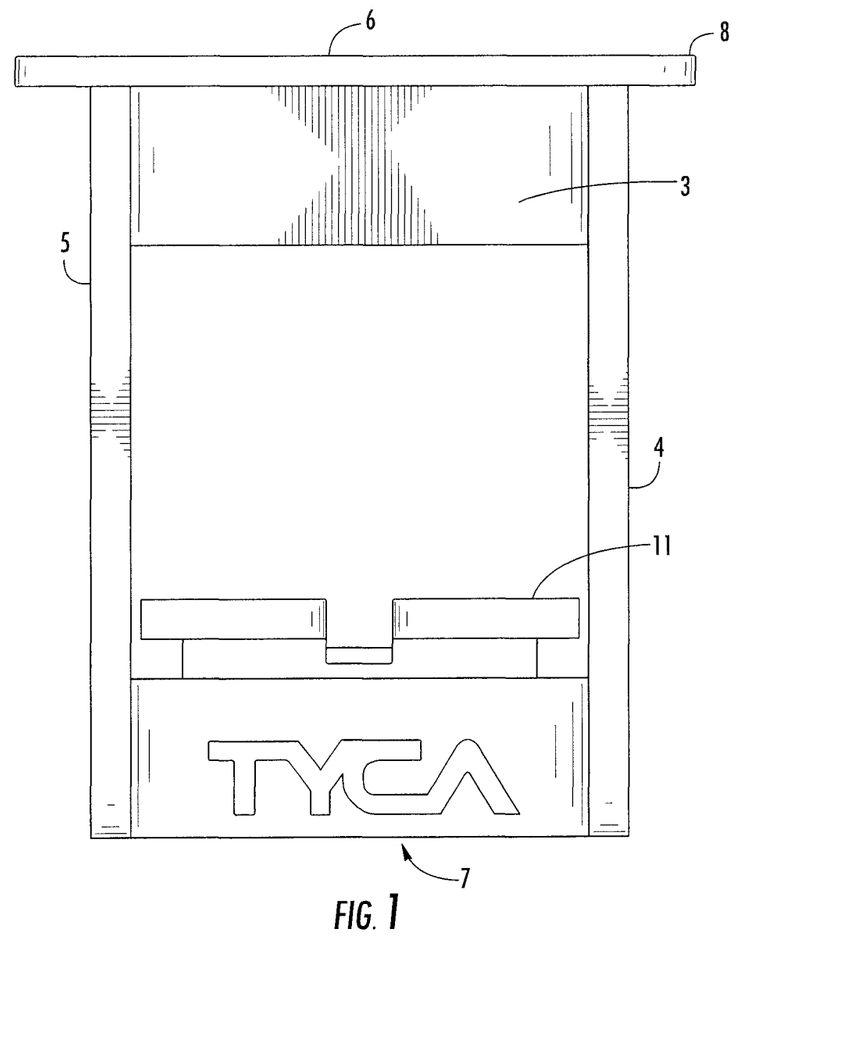
FIG. 1 is a planar front view of a first embodiment of the present invention.
Figure 2:
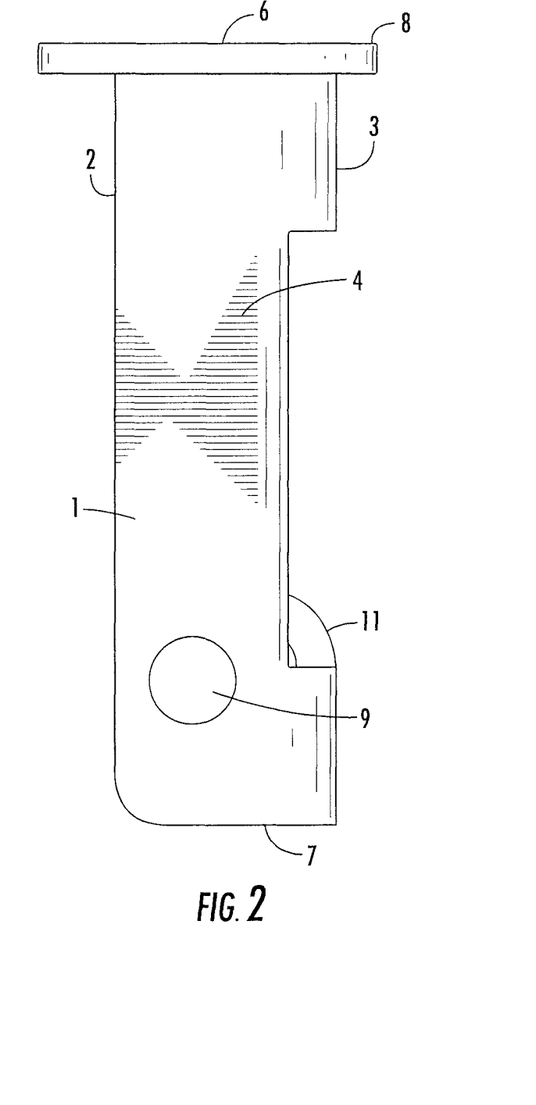
FIG. 2 is a planar right side view of a first embodiment of the present invention.
Figure 3:
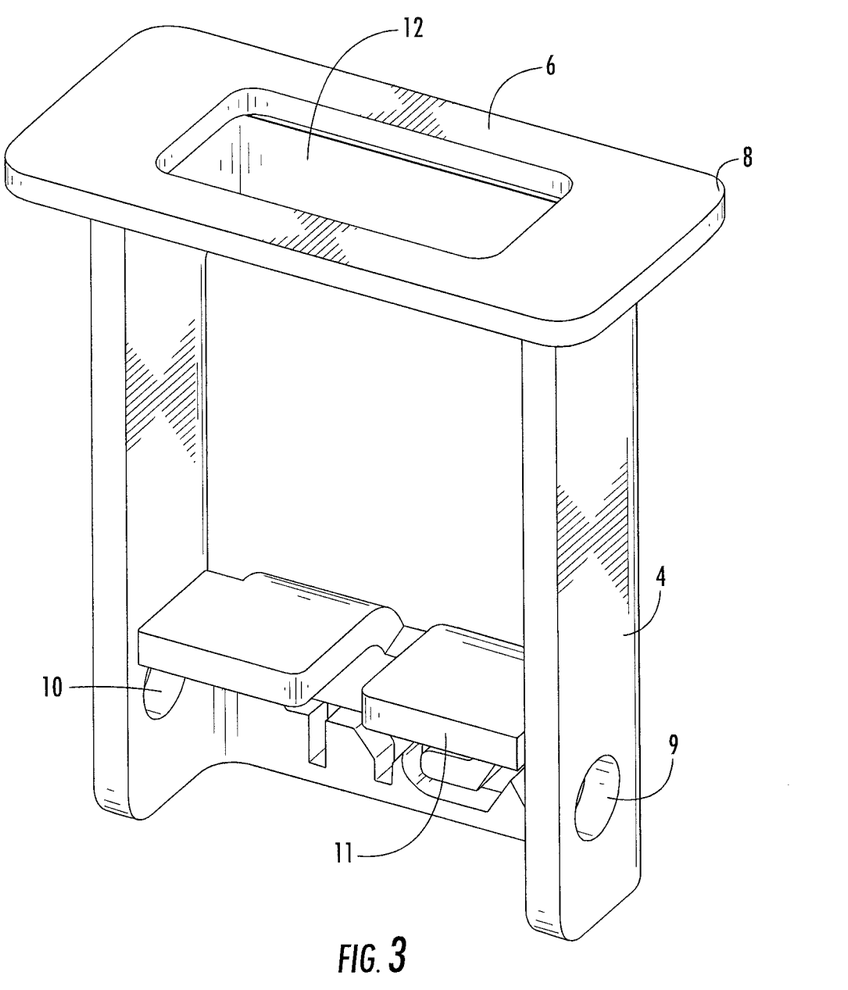
FIG. 3 is a three-dimensional view of a first embodiment of the present invention.

With reference now to the drawings, FIGS. 1-3 show a first preferred embodiment of the present invention. The insert 1 may be manufactured with a heavy-duty steel c-channel shape, and orthogonally welded to a flat first end plate 6. The insert 1 comprises a back 2, a front 3, a right side 4, and a left side 5. The insert is dimensioned so as to fit within the interior of a stake pocket securely. First end metal plate 6 is essentially rectangular and flat, and is oversized relative to the insert and the stake pocket, with a lip 8 extending well beyond the edges of the bracket channel and edges of the stake pocket hole entry. The first end metal plate 6 comprises a chain hole 12 therethrough at approximately the center of the plate, with said hole sufficient to pass a chain. The chain (not shown) may be any chain or similar fastening or binding device known to one skilled in the art.

The insert 1 comprises a right retaining hole 9 and a left retaining hole 10, provided through the right side 4 and left side 5, respectively. In the first preferred embodiment, a chain securement hook 11 is provided immediately adjacent to the position between the right retaining hole 9 and left retaining hole 10 in the insert 1. In use, the first end of a chain is passed through the chain hole 12 into the insert 1. A pin 14 is passed from the outside of the insert through one of the two retaining holes 9 and 10, into a position adjacent the chain securement hook 11 and through a first end of a chain, then out of the insert through the other of the two retaining holes 9 and 10, thus anchoring the chain to the insert and indirectly to the trailer or truck. For its installation, the insert of the first embodiment is inserted from the top of the stake pocket, with the oversized first end metal plate 6 overlapping the surface of the bed or trailer adjacent the stake pocket hole to secure the first end of the insert to the uppermost portion of the stake pocket.

Figure 4:
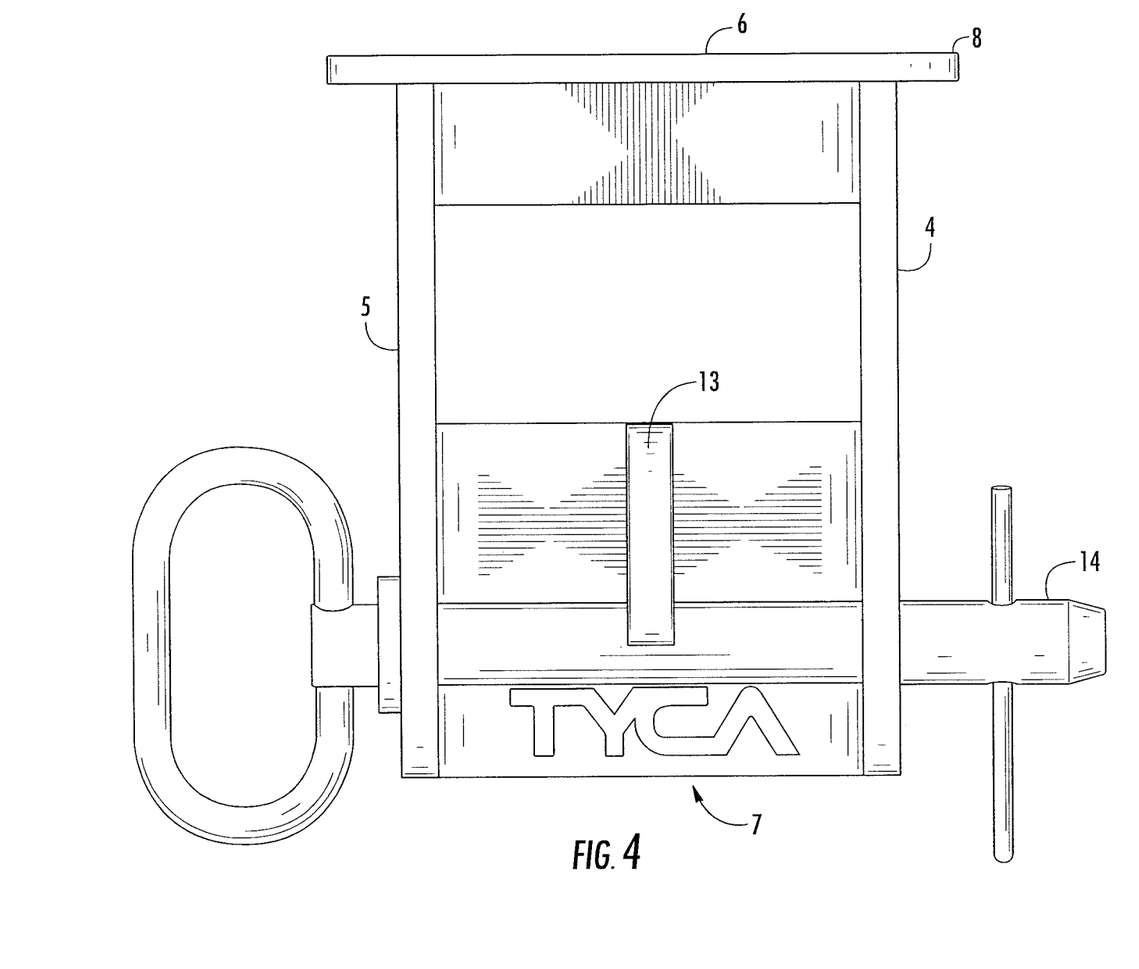
FIG. 4 is a planar front view of a second embodiment of the present invention.
Figure 5:
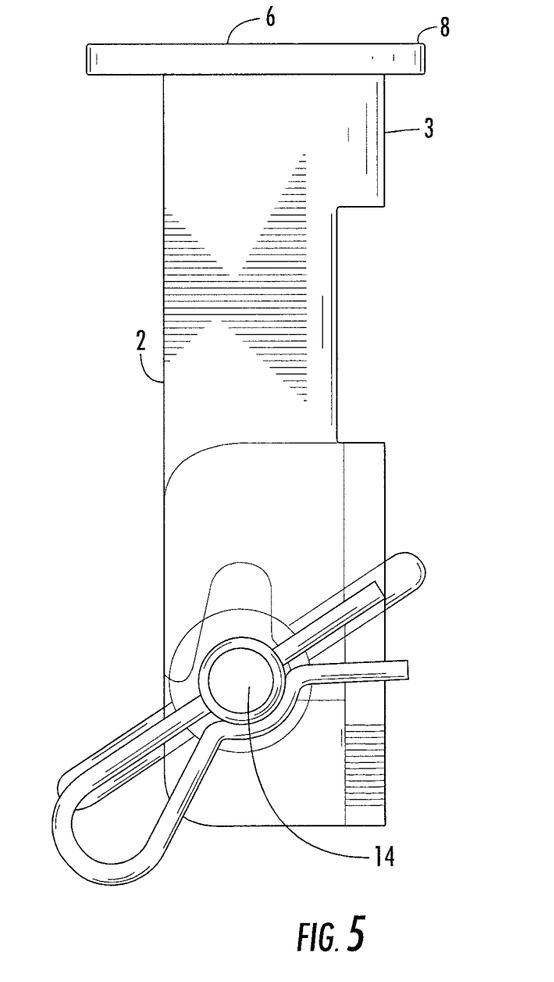
FIG. 5 is a planar right side view of a second embodiment of the present invention.
Figure 6:
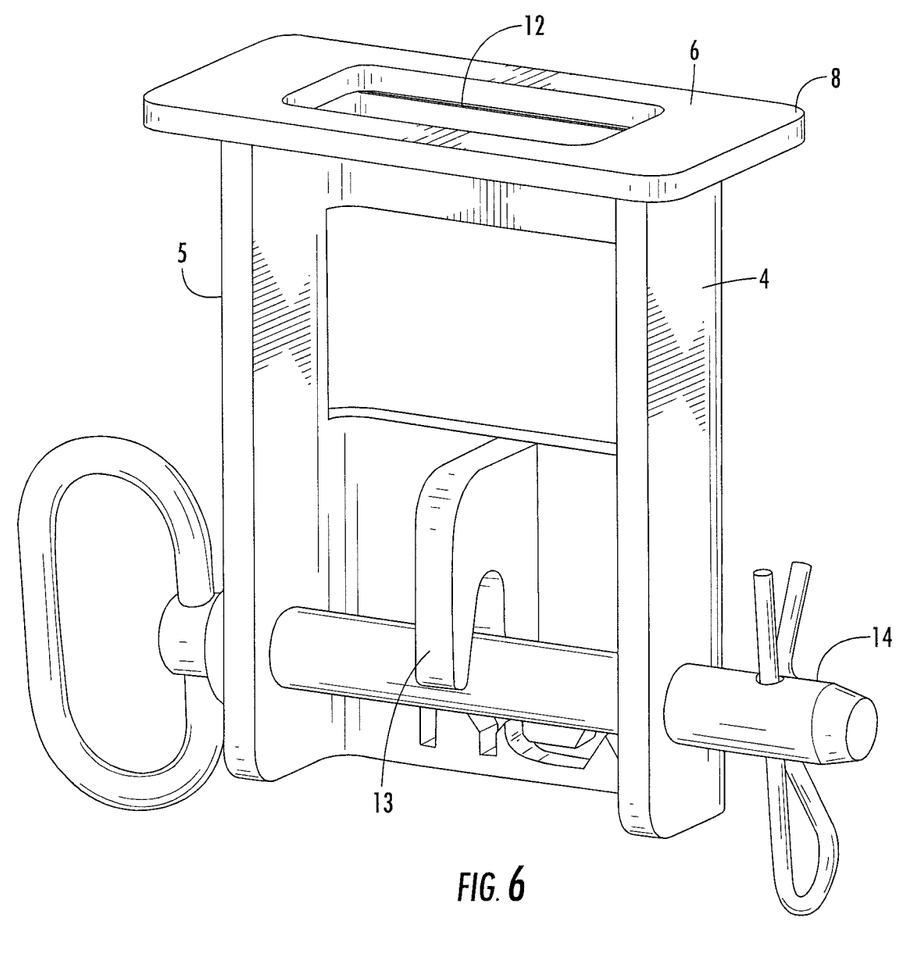
FIG. 6 is a three-dimensional view of a second embodiment of the present invention.

FIGS. 4-6 show a second preferred embodiment of the present invention. S in the first preferred embodiment, the insert 1 has a first end plate 6, a back 2, a front 3, a right side 4, and a left side 5. The insert is dimensioned so as to fit within the interior of a stake pocket securely. First end metal plate 6 is essentially rectangular and flat, and is oversized relative to the insert and the stake pocket, with a lip 8 extending well beyond the edges of the bracket channel and edges of the stake pocket hole entry. The first end metal plate 6 comprises a chain hole 12 therethrough at approximately the center of the plate, with said hole sufficient to pass a chain. The chain (not shown) may be any chain or similar fastening or binding device known to one skilled in the art.

The insert 1 comprises a right retaining hole 9 and a left retaining hole 10, provided through the right side 4 and left side 5, respectively. In the second preferred embodiment, a chain securement tab 13 is provided immediately adjacent to the position between the right retaining hole 9 and left retaining hole 10 in the insert 1. In use, the first end of a chain is passed through the chain hole 12 into the insert 1. A pin 14 is passed from the outside of the insert through one of the two retaining holes 9 and 10, into a position adjacent the chain securement tab 13 and through a first end of a chain, then out of the insert through the other of the two retaining holes 9 and 10, thus anchoring the chain to the insert and indirectly to the trailer or truck. For its installation, the insert of the second embodiment is inserted from the top of the stake pocket, with the oversized first end metal plate 6 overlapping the surface of the bed or trailer adjacent the stake pocket hole to secure the first end of the insert to the uppermost portion of the stake pocket.

As shown in FIGS. 1, 3, 4, and 6, the front and back of the insert of the present invention do not need to be solid. Including open portions in these panels, such as those illustrated, can reduce the cost of the devices, decrease the weight, and result in increased space for the storage of chains when the chains are not in use.

The present invention is also directed to a stake pocket chain tie-down for a trailer or truck bed comprising at least one stake pocket. The stake pocket tie-down is insertable into said stake pocket through an uppermost opening of the stake pocket. The stake pocket tie-down provides for connection of a load restraining chain. The stake-pocket tie-down comprises an insert manufactured of metal, dimensioned to fit securely within the interior of the stake pocket. The insert has a back, a front, a right side, a left side, and has both first and second ends. The insert further comprises a substantially flat and rectangular metal plate attached to the first end of the insert, with the metal plate being dimensioned to be longer and wider than the dimensions of the insert itself. This leaves a portion of the metal plate extending beyond the dimensions of the insert forming a lip. The metal plate also has a hole extending through the metal plate at approximately the center of the plate, with the hole opening into an inner chamber formed by the back, front, right side, left side, and first end plate of the insert. The hole is dimensioned sufficient to provide for passage of a chain therethrough. The insert further has retaining holes extending through both the right side and left side of the insert, with the retaining holes being both located at substantially the same distance from the first end plate. The insert has a chain securement hook adjacent to the retaining holes. The stake tie-down has a pin for insertion into the insert through one of the retaining holes, then through an end of a chain, and then through the other one of the retaining holes out of the insert.

The present invention is also directed to a stake pocket chain tie-down for a trailer or truck bed comprising at least one stake pocket. The stake pocket tie-down is insertable into said stake pocket through an uppermost opening of the stake pocket. The stake pocket tie-down provides for connection of a load restraining chain. The stake-pocket tie-down comprises an insert manufactured of metal, dimensioned to fit securely within the interior of the stake pocket. The insert has a back, a front, a right side, a left side, and has both first and second ends. The insert further comprises a substantially flat and rectangular metal plate attached to the first end of the insert, with the metal plate being dimensioned to be longer and wider than the dimensions of the insert itself. This leaves a portion of the metal plate extending beyond the dimensions of the insert forming a lip. The metal plate also has a hole extending through the metal plate at approximately the center of the plate, with the hole opening into an inner chamber foiled by the back, front, right side, left side, and first end plate of the insert. The hole is dimensioned sufficient to provide for passage of a chain therethrough. The insert further has retaining holes extending through both the right side and left side of the insert, with the retaining holes being both located at substantially the same distance from the first end plate. The insert has a chain securement tab adjacent to the retaining holes. The stake tie-down has a pin for insertion into the insert through one of the retaining holes, then through an end of a chain, and then through the other one of the retaining holes out of the insert.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A stake pocket chain tie-down for a trailer or truck bed comprising at least one stake pocket, said stake pocket comprised of an uppermost opening relative to the trailer or truck bed, a lowermost opening, and a channel therebetween said uppermost and lowermost openings,
   wherein said stake pocket tie-down is configured for initial insertion in a substantially downward direction into said at least one stake pocket through said uppermost opening of said stake pocket, wherein said stake pocket tie-down provides for connection of a load restraining chain.

2. The stake pocket chain tie-down of claim 1, further comprising:
   an insert manufactured of metal, dimensioned to fit securely within the interior of said at least one stake pocket,
   said insert further comprising a back, a front, a right side, a left side, and having first and second ends, said insert configured for insertion into said stake pocket starting with said second end of said insert into said uppermost opening of said stake pocket.

3. The stake pocket chain tie-down of claim 2, said insert further comprising:
   a substantially flat and rectangular metal plate attached to said first end of said insert, wherein said metal plate is dimensioned to be longer and wider than the dimensions of said insert, such that a portion of said metal plate extends beyond the dimensions of the insert forming a lip extending beyond the outer dimensions of said uppermost opening of said stake pocket.

4. The stake pocket chain tie-down of claim 3, said metal plate further comprising a hole extending through the metal plate at approximately the center of said metal plate, said hole opening into an inner chamber formed by the back, front, right side, left side, and first end plate of said insert, said hole being dimensioned sufficient to provide for passage of a chain therethrough.

5. The stake pocket tie-down of claim 2, said insert further comprising retaining holes extending through said right side and said left side of said insert, said retaining holes being both located at substantially the same distance from said first end plate, and said insert further comprising a chain securement hook adjacent to said retaining holes, and said stake tie-down further comprising a pin for insertion into said insert through one of said retaining holes, then through an end of a chain, and then through the other one of said retaining holes out of said insert.

* * * * *